United States Patent
Partanen et al.

(10) Patent No.: US 9,672,198 B2
(45) Date of Patent: Jun. 6, 2017

(54) METHOD, A CLIENT DEVICE, A SERVER, A COMPUTER SYSTEM AND A COMPUTER READABLE MEDIUM FOR RELOADING AN OBJECT FROM A FOLDER ARRANGEMENT

(75) Inventors: Timo Partanen, Lempäälä (FI); Antti Nivala, Pirkkala (FI)

(73) Assignee: M-Files Oy, Tampere (FI)

( * ) Notice: Subject to any disclaimer, the term of this patent is extended or adjusted under 35 U.S.C. 154(b) by 488 days.

(21) Appl. No.: 12/803,740

(22) Filed: Jul. 2, 2010

(65) Prior Publication Data

US 2012/0005574 A1 Jan. 5, 2012

(51) Int. Cl.
| | |
|---|---|
| G06F 17/00 | (2006.01) |
| G06F 17/22 | (2006.01) |
| G06F 21/62 | (2013.01) |
| G06F 17/30 | (2006.01) |

(52) U.S. Cl.
CPC .... *G06F 17/2288* (2013.01); *G06F 17/30115* (2013.01); *G06F 17/30174* (2013.01); *G06F 17/30194* (2013.01); *G06F 21/6218* (2013.01); *G06F 2221/2145* (2013.01); *Y10S 707/99931* (2013.01); *Y10S 707/99953* (2013.01)

(58) Field of Classification Search
CPC ........... G06F 17/30174; G06F 17/2288; G06F 17/30115; G06F 17/30194; G06F 21/6218; G06F 2221/2145; Y10S 707/99931; Y10S 707/99953
USPC ........................................ 715/255, 206, 229
See application file for complete search history.

(56) References Cited

U.S. PATENT DOCUMENTS

| | | | |
|---|---|---|---|
| 2003/0115226 A1* | 6/2003 | Gopalan | 707/205 |
| 2003/0200207 A1* | 10/2003 | Dickinson | 707/3 |
| 2006/0041600 A1* | 2/2006 | Lehtola et al. | 707/201 |
| 2006/0122955 A1* | 6/2006 | Bethlehem et al. | 707/1 |
| 2006/0230079 A1* | 10/2006 | Strahl | G06F 11/1435 707/999.203 |
| 2007/0276962 A1* | 11/2007 | La Pensee | 709/248 |
| 2010/0023526 A1* | 1/2010 | Nivala | 707/10 |
| 2010/0049565 A1* | 2/2010 | Aebig et al. | 705/7 |

* cited by examiner

*Primary Examiner* — Nathan Hillery
(74) *Attorney, Agent, or Firm* — Ware, Fressola, Maguire & Barber LLP

(57) ABSTRACT

The invention relates to a method, to a client device, to a server, to a computer system and to a computer readable medium, where the computer system stores a folder arrangement comprising one or more folders. In the method changes having occurred in the folder arrangement are determined; and the method comprises determining which changes relate to which folder and updating at least one folder with respect to changes.

13 Claims, 3 Drawing Sheets

METHOD, A CLIENT DEVICE, A SERVER, A COMPUTER SYSTEM AND A COMPUTER READABLE MEDIUM FOR RELOADING AN OBJECT FROM A FOLDER ARRANGEMENT

FIELD OF THE INVENTION

This invention relates to a computer system and especially to reloading of object from a folder arrangement in such a system.

BACKGROUND OF THE INVENTION

Content management systems (CMS), document management systems (DMS) and data management systems refer to systems for managing electronic documents. In the present disclosure the term "document management system" is a general term referring also to content and data management systems. Such systems comprise various features for managing electronic documents, e.g. storing, versioning, indexing, searching for and retrieval of documents. It is appreciated that there are both dynamic and static document management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

Document management systems are often used by multiple client devices that contact the server in order to work with the documents stored in the document management system. Every time the client device refreshes or access the folder located in the document management system, the server returns the full content of the folder. A performance problem relating to a retrieval of folders may occur especially when multiple clients are working with the server simultaneously. The folder listing may become slow because of a lot of data reading and processing and data transfer.

Therefore there is a need for an improved solution, by means of which processing load and data read can be reduced. Due to that, also processing times can be reduced.

SUMMARY OF THE INVENTION

The aim of the present invention is to accelerate the folder listing and reloading of objects in e.g. a document management system. Another aim of the present invention is to provide a solution that enhances the performance of the document management system from what has been before the present solution.

These aims are achieved by a method, a client device, a server, a computer system and a computer readable medium.

An example of the method for a computer system storing a folder arrangement comprising one or more folders, wherein a folder comprises one or more objects, comprises determining changes having occurred in the folder arrangement; determining which changes relate to which folder and updating at least one folder with respect to the changes.

Another example of a method comprises receiving a request for updating a folder, as a response to which, the changes are determined.

Yet another example of the method comprises keeping track of changes occurring after loading a folder for a first time.

Yet another example of the method comprises assigning an identifier to a tracked change.

In yet another example of the method the change relate to an object modification, deletion or creation.

Yet in another example of the method updating a folder comprises one of the following operations as an independent operation or as part of another operation: reloading a folder or requesting changes relating to the folder.

An example of the client device has a connection to a server and comprises a view to a folder in a folder arrangement being stored at least in said server. The client device is configured to receive from the server changes having occurred in the folder arrangement; and if the received changes comprise changes to the viewed folder, to update said folder with respect to the changes.

Another example of the client device is configured to update also other folders with respect to the changes, if the received changes comprise changes to the other folders.

Yet another example of the client device is configured to request updating of at least the viewed folder from the server as a response to which the changes are received.

An example of the server has a connection to a client device and is configured to store a folder arrangement comprising one or more folders. The server is further configured to determine changes having occurred in the folder arrangement; and transmit the changes to the client device.

Another example of the server is configured to determine which changes relate which folder and transmit to the client device changes to at least one folder.

Yet another example of the server is configured to keep track of changes occurring after loading a folder for a first time.

Yet another example of the server is configured to assign an identifier to a tracked change.

In yet another example of the server, the change relates to an object modification, deletion or creation.

An example of the computer system comprises at least one client device and at least one server, wherein said client device is connected to said server, and wherein said server is configured to store a folder arrangement comprising one or more folder, wherein a folder comprises one or more objects, wherein the client device comprises a view to a folder in said folder arrangement, wherein said server is configured to determine changes having occurred in the folder arrangement and to transmit the changes to the client device; and wherein the client device is configured to determine if the received changes comprise changes to the viewed folder, whereby the client device is configured to update said viewed folder with respect to the changes.

In another example of the computer system the client device is configured to determine whether the received changes comprise changes to other folders than the viewed folder, and to update also such folders with respect to changes.

In yet another example of the computer system said server is further configured to keep track of changes occurring after loading a folder for a first time.

In yet another example of the computer system said server is further configured to assign an identifier to a tracked change.

In yet another example of the computer system the client device is configured to request updating of at least the viewed folder from the server as a response to which the changes are received.

In yet another example of the computer system a change relate to an object modification, deletion or creation.

In yet another example of the computer system the folder arrangement is part of a document management system.

Yet another example of the computer system comprises numerous amount of client devices.

In yet another example of the computer system updating a folder comprises one of the following operations as an independent operation or as part of another operation: reloading a folder or requesting changes relating to the folder.

An example of the computer readable medium comprises computer program instructions stored thereon, wherein said instructions when executed are for determining changes having occurred in a folder arrangement; determining which changes relate to which folder and updating at least one folder with respect to the changes.

Due to the present solution the scalability of the system is improved because of processing load is moved from the server to the client computers.

Even though the greatest benefit of the present solution can be achieved in client-server systems operated by multiple clients, it is appreciated that other computerized file management systems can also gain from the solution.

DESCRIPTION OF THE DRAWINGS

The invention is described in more detailed manner by means of the following disclosure and the drawings, where.

DETAILED DESCRIPTION OF THE INVENTION

Figure 1:
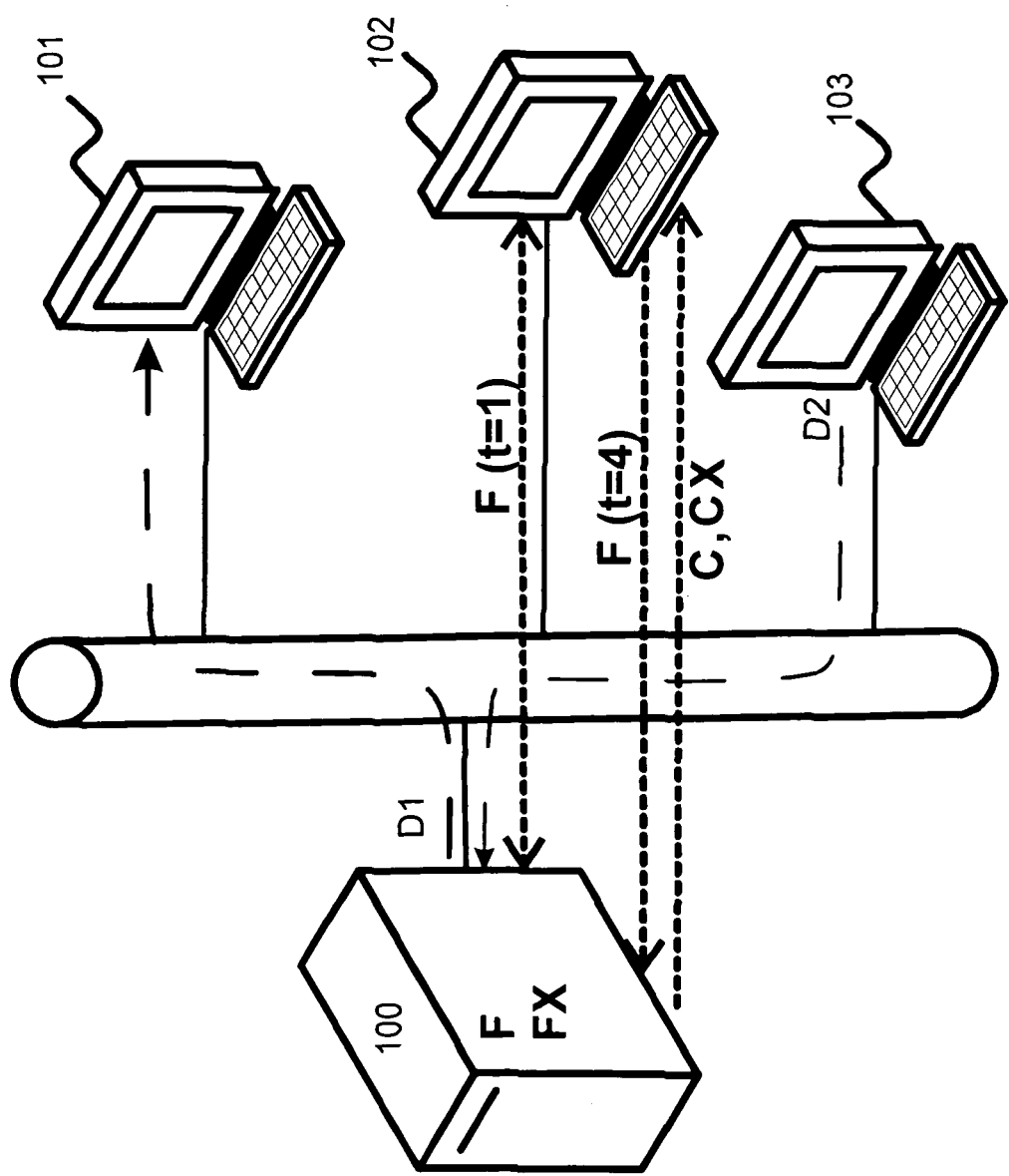
FIG. 1 illustrates an example of a document management system.

Before describing the invention in more detailed manner, a few terms are defined in order to ease the reading and understanding of the invention. "File" in this disclosure relates to a medium that has been created by a certain application. For example, a piece of text created by using the Microsoft Word application is a file. In the context of document management system, the file becomes a "document" after metadata is associated with it. Term "object" refers to content of the folder, and is used to cover terms "document", "file" and "folder". "Metadata" refers to information on a document's properties. For example, a creator of the file or a creation date may represent content of the metadata. "Document management system" is used for describing both "document management systems" as such, but also "content management systems" or "data management systems". "Folders" comprises objects, i.e. documents, files and folders virtually. Virtual location is defined by giving a document location(s) as its metadata, which then addresses the document into a certain folder depending on the route the document is approached. Therefore the content of the folder depends on the previous folder level and may vary according to a use case and is thus dynamic. When a folder is requested, e.g. by selecting a corresponding icon appearing in a user interface of the document management system with a selection device (e.g. a mouse, a stylus, a key), the server performs a listing of the folder's content. Due to that, the user is shown a list of the documents created for the folder in question.

As was mentioned in the background portion, the document management system can be dynamic so that the folders are virtual, and the documents are virtually located in the folder. In addition to the document management system, the present solution can be utilized in a file management system storing folders that comprises files. The difference between file management system and the document management system is that in the file management system the files and folders have static location, whereas in the document management system the files are usually located in virtual folders and are thus dynamic in nature. Documents can have more than one location in the document management system but the document as such is the same document throughout the locations. In other words, the document is stored into the document management system only once, but is given multiple locations as its properties. Therefore, term "location" should be interpreted both physical and virtual location depending on the folder arrangement to cover both document management system and file management system. However, what should be noticed is that every time the reader notices a term "document management system" in the present disclosure, s/he should interpret the term as to comprise both document management and file management systems. Term "folder arrangement" can be used as a broader term for document and file management systems. In the following, also terms "change" and "modification" are used. In this disclosure, "change" is a general term covering different types of changes (e.g. deletion, creation, modification). Modification, on the other hand, relates to an operation made for e.g. a document in order to amend the document.

FIG. 1 illustrates an example configuration of a computer system being a document management system comprising a document management server 100 and client devices 101, 102, 103, which are all interconnected. The interconnection can be wired or wireless and it may be substantially always on or it may be disconnected occasionally. The server 100 is configured to store documents in folders that can be retrieved by the client devices 101, 102, 103. The server and client devices each typically include at least one processor and at least one memory (computer readable medium) for storage of at least computer program code for execution by the at least one processor. The client device can be any electronic device capable of computing, such as e.g. a personal computer, a laptop, a mobile device. For example, in FIG. 1 document D1 is retrieved by client device 101, whereas document D2 is stored by the client device 103 to the document management server 100. The document management server 100 is configured mainly to store documents, but in use the document management server may have other functions as well, e.g. it controls access rights, registers modifications made to documents and allows connections to other systems. In addition to retrieving documents, the client device can ask folder listing F, as is shown in FIG. 1 by device 102. It is to be noticed that in one example both previously mentioned documents may be located in folder F, which causes load to reading of folder F. In FIG. 1, there are one server. However, in some cases, the computer system may comprise more than one server where the document management system is divided.

Figure 2:
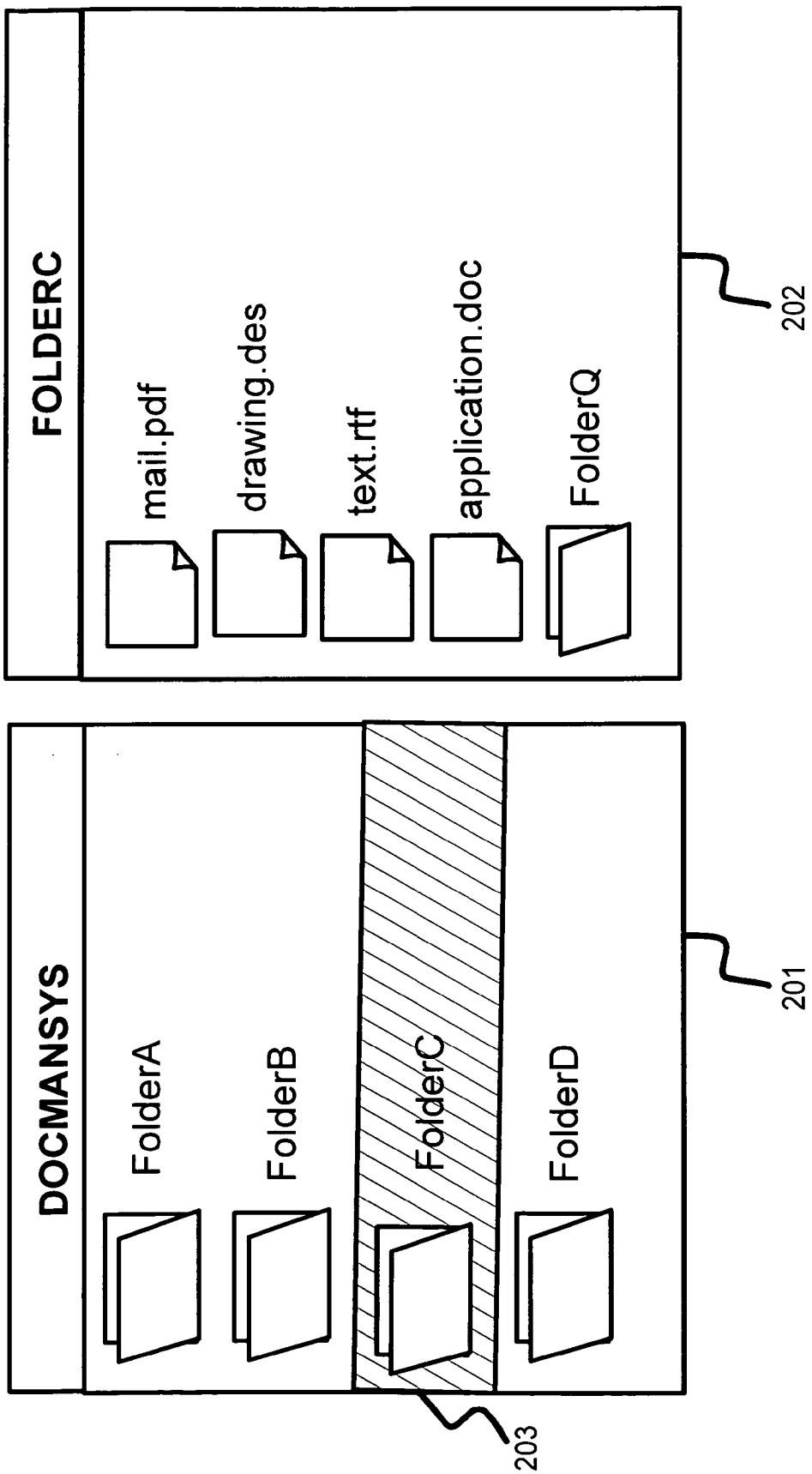
FIG. 2 illustrates an example of document listing within a folder, and FIG. 3 illustrate an example of the present solution divided to actions made by a client and a server.

When a client requests a folder for the first time, the server returns a full content of the folder. In FIG. 2, the selection (i.e. request) of a folder is shown. It is to be noticed that the user interface view is illustrated in very simplified manner. The actual layout and appearance can deviate greatly from FIG. 2. Views 201, 202 are presented to the user in client device's user interface. The views can be shown simultaneously or only one active view at a time. The first view 201 presents all the folders in the document management system.

The second view 202 is opened after the selection of "FolderC" 203. The view 202 presents the content of "FolderC" 203 i.e. document listing "mail.pdf", "drawing.des", "text.rtf", "application.doc" and "FolderQ".

Figure 3:
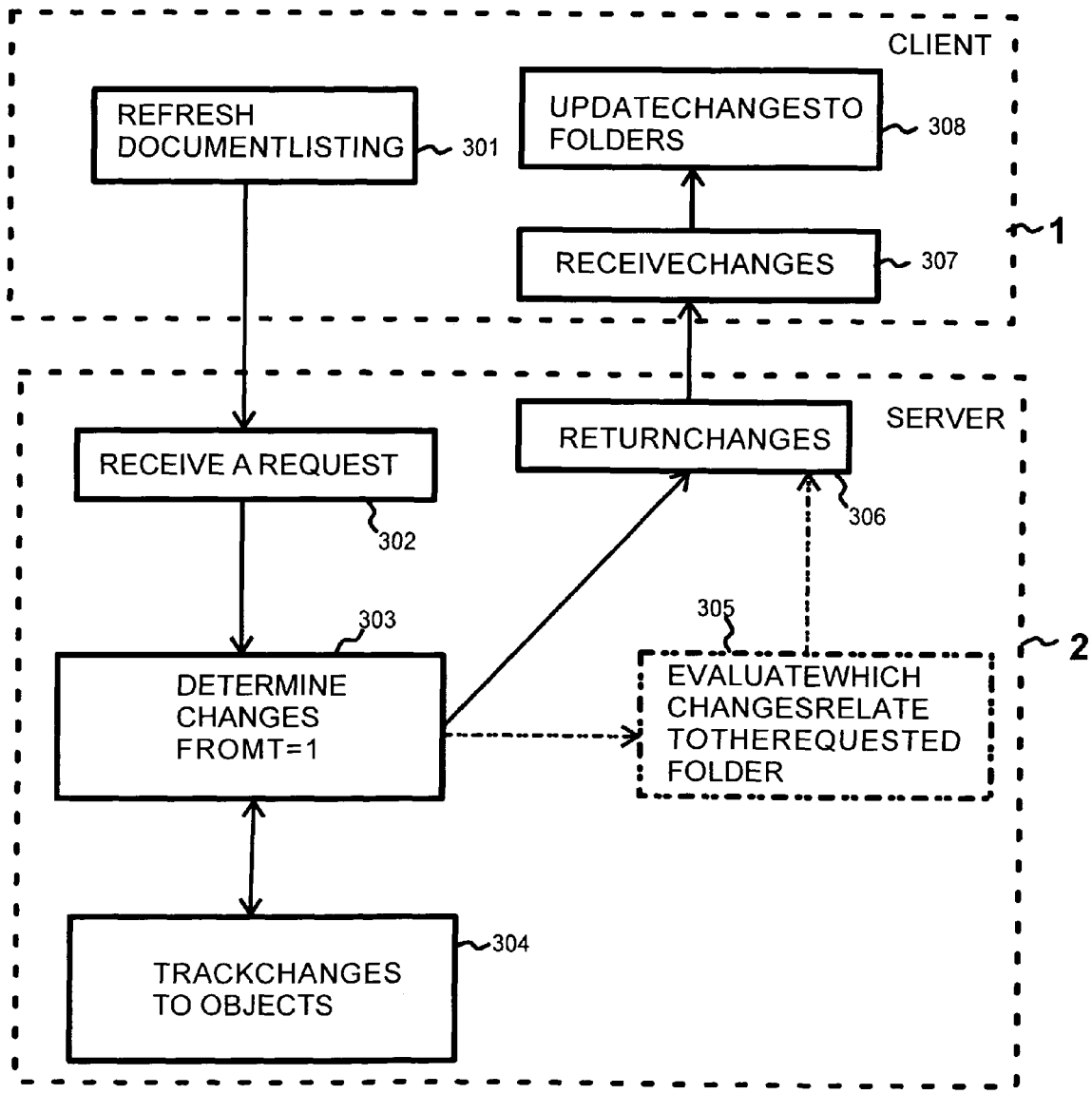

Traditionally, the second request for the folder (i.e. refresh/reloading/updating the folder, i.e. listing the content of the folder) has also caused the server to return the full content of the folder. However, as said, this has caused a performance problem. In the present solution (one example is shown in FIG. 3), due to the second request, the server goes through all the changes that have been occurred in the document system after a certain time t=1 and returns only the changes. The time t=1 may be set to be the time the user requested the folder for the first time.

Let us go back to FIG. 1 and assume that client device 102 retrieves the folder F due to which the server sets time to t=1. After time t=1, the client device 101 modifies document D1 that is, in this example, located in a folder FX, and the client device 103 adds a new document D2 to the folder F. The server 100 is configured to keep track of changes occurring in the server after t=1, and to mark the changes CX and C to the folder FX and folder F respectively. Now, the client device 102 wishes to reload the content of folder F. This causes a new request of folder F (at time t=4) to the server 100. Instead of responding with a full content of folder F, the server 100 returns changes CX, C to the client device 102 and continues tracking changes from time t=4.

The client device 102 may go through changes CX, C and determine which of the changes belongs to the folder F. As a result of the determination, the client device 102 updates the content of folder F with a new document D2. In addition to the update of folder F in the client device 102, the client device may also update the content of folder FX with modified document D1.

FIG. 3 presents a solution, where a client 1 is communicating with a server 2. The server 2 is configured to store a document management system. The client 1 reloads a document listing (301) shown in the client's 1 display. In practice this means that the client 1 requests the content of a certain folder, which causes the request for a new listing of documents. The request may be a request only for changes or a request for reloading the folder again. In addition, the request may be an independent operation or a part of another request.

The server 2 receives the request (302) and determines (303) which changes have occurred in the document management system after the user asked the folder for the first time. For enabling the server to return the changes to clients, it has to keep track (304) of changes made to the objects. As said, the change can be a modification of a document, creation of a new document, a deletion of a document. The tracking can be performed by assigning an identifier to each change. Therefore, clients are returned each change only once. It is appreciated that instead of assigning an identifier to each change, some other registering method for changes can be used, The server can be configured to select (305) the changes that relate to the folder requested and to return only those (306). Optionally, the server 2 can directly return (306) all the changes, whereby the client device 1 performs the sorting after receiving (307) the changes. The sorting can be performed by updating the changed objects in all folders (not in the current folder only) (308). In some cases, the client device 1 can only update the requested folder and neglect other changes. The document listing shown in the client's device is thus updated by the changes. Previously cached contents (i.e. result of the first request) can be returned immediately if no changes were made to the objects stored in the folder.

Typically, the amount of changed data is smaller than the full content of the folder. Therefore, the download of the changes happens faster than downloading the full content. Sometimes this is not the case, and therefore the present solution can be conditional. Therefore, if the amount of changes is greater than a predetermined limit (the value of which can depend on the case), the server does not return the changes but the full content of the folder. In some cases, the server may also count the amount of changes from past (e.g. from time t=1), and define whether the amount of changes is smaller compared to the content of the folder. In that case, the server may return the one the content of which is smaller.

In the previous, an example of the present solution has been discussed. In the solution, a server tracks object changes and receives a (second) request for a folder listing from a client. Instead of returning the content of the folder, the server returns the tracked changes to the client. The server may return all the changes that have occurred in the folder arrangement or only the ones that concern the requested folder. The client updates the locations of the changed objects in folders that already have been listed.

In the previous, the solution has been disclosed as a client-server-solution for a document management system. However, the solution can be applied to other systems as well and implemented in one device. The core of the solution—i.e. to return only changes to a folder and to the objects in the folder to a request for a folder—can thus be utilized in numerous systems.

Further, the foregoing detailed description discloses the present invention by means of an example. The skilled person will appreciate that the detailed description has been given for better understanding of the invention, and some of the features (e.g. system configuration) may vary depending on the possible other functionalities that are incorporated with the document or file management system.

What is claimed is:

1. A method for efficient utilization of a computer system, wherein said computer system comprises at least one client device and a server device, said server device comprising a memory for storing a folder arrangement in electronic form, the folder arrangement comprising one or more electronic folders, wherein an electronic folder comprises one or more electronic objects, each electronic object being identified by an identification for identifying a respective object from said one or more electronic objects, wherein said method comprises:

receiving a folder load request from a client device;
determining if the folder load request is a first load request or a second or a further load request, wherein
when the folder load request is a first load request, the method further comprises returning all the electronic objects of the requested folder to the client device, and
when the folder load request is a second or further load request, the method further comprises:
comparing an amount of registered changes to a predetermined limit, and
when the amount of registered changes is greater than the predetermined limit, loading all the electronic objects of the requested folder to the client device in response to the folder load request; and
when the amount of registered changes is not greater than the predetermined limit, loading information on registered changes with corresponding identifiers and with related objects to the client device, and updating at least the requested folder according to the received information on the changes, wherein said updating includes determining by the client device which changes of the registered changes relate to requested folder; and registering by the server device changes occurring in the folder arrangement after said folder load request, wherein a change relates to an object having an identification, and assigning an identifier to each change.

2. The method according to claim 1, where the change relates to an object modification, deletion or creation.

3. The method according to claim 1, where updating a folder comprises one of the following operations as an independent operation or as part of another operation: reloading a folder or requesting changes relating to the folder.

4. A server device having a connection to a client device, wherein said server device comprises a processor and a memory for storing computer program code and a folder arrangement in electronic form, the folder arrangement comprising one or more electronic folders, wherein an electronic folder comprises one or more electronic objects, each electronic object being identified by an identification for identifying a respective object from said one or more electronic objects, the memory and the computer program code are configured to, with the at least one processor, cause the server device to perform at least the following:

receiving a folder load request from a client device;
determining if the folder load request is a first load request or a second or a further load request, wherein
when the folder load request is a first load request, the server device is further caused to perform returning all the electronic objects of the requested folder to the client device, and
when the folder load request is a second or further load request, the server device is further caused to perform
comparing an amount of registered changes to a predetermined limit, and
when the amount of registered changes is greater than the predetermined limit, loading all the electronic objects of the requested folder to the client device in response to the folder request; and
when the amount of registered changes is not greater than the predetermined limit, loading information on registered changes with corresponding identifiers and with related objects to the client device; and registering changes occurring in the folder arrangement after said folder load request, wherein a change relates to an object having an identification, and assigning an identifier to each change.

5. The server device according to claim 4, wherein the memory and the computer program code are further configured to, with the at least one processor, cause the server device to perform determining which changes relate which folder and transmitting to the client device changes to at least one folder.

6. The server device according to claim 4, where the change relates to an object modification, deletion or creation.

7. A computer system comprising:
at least one client device comprising a processor; and
at least one server device comprising a processor and a memory,
wherein said client device is connected to said server device, and wherein the memory of said server device is configured to store a folder arrangement in electronic form, the folder arrangement comprising one or more electronic folders, wherein an electronic folder comprises one or more electronic objects, each electronic object being identified by an identification for identifying a respective object from said one or more electronic objects, and wherein the client device comprises a user interface configured to display a view to an electronic folder in said electronic folder arrangement, wherein the server device is configured:
to receive a folder load request from the client device;
to determine if the folder load request is a second or a further load request, wherein
when the folder load request is a first load request, the server device is configured to return all the electronic objects of the requested folder to the client device and
when the folder load request is a second or a further load request, the server device is configured to
compare an amount of registered changes to a predetermined limit, and
when the amount of registered changes is greater than the predetermined limit, to load all the electronic objects of the requested folder to the client device in response to the folder load request; and
when the amount of registered changes is not greater than the predetermined limit, to load information on the registered changes with corresponding identifiers and with related objects to the client device, and the client device is configured to update at least the requested folder according to the received information on the changes, wherein said updating includes determining by the client device which changes of the registered changes relate to requested folder; and
wherein the server device is further configured to register changes occurring in the folder arrangement after the folder load request, wherein a change relates to an object having an identification, and an identifier is assigned to each change.

8. The computer system according to claim 7, wherein said client device is configured to determine whether the received changes comprise changes to other folders than the viewed folder, and to update also such folders.

9. The computer system according to claim 7, where a change relates to an object modification, deletion or creation.

10. The computer system according to claim 7, where the folder arrangement is part of a document management system.

11. The computer system according to claim 7 comprising numerous amount of client devices.

12. The computer system according to claim 7, where updating a folder comprises one of the following operations as an independent operation or as part of another operation: reloading a folder or requesting changes relating to the folder.

13. A non-transitory computer readable medium for a folder arrangement comprising one or more folders, wherein a folder comprises one or more objects, each object being identified by an identification, said computer readable medium comprising computer program instructions stored thereon, wherein said instructions, when executed cause a processor of a server device to perform:
    receiving a folder load request from a client device;
    determining if the folder load request is a first load request or a second or further load request, wherein
        when the folder load request is a first load request, the processor of the server device is caused to perform returning all the electronic objects of the requested folder to the client device, and
        when the folder load request is a second or subsequent load request, the server device is caused to
            compare an amount of registered changes to a predetermined limit, and
                when the amount of registered changes is greater than the predetermined limit, to load all the electronic objects of the requested folder to the client device in response to the folder load request; and
                when the amount of registered changes is not greater than the predetermined limit, to load information on the registered changes with corresponding identifiers and with related objects to the client device; and
    registering changes occurring in the folder arrangement after the folder load request, wherein a change relates to an object having an identification, and to assign an identifier to each change.

\* \* \* \* \*